United States Patent

[11] 3,624,475

| [72] | Inventor | Brian Turton Smith<br>London, England |
|---|---|---|
| [21] | Appl. No. | 809,877 |
| [22] | Filed | Mar. 24, 1969 |
| [45] | Patented | Nov. 30, 1971 |
| [73] | Assignee | Westinghouse Brake and Signal Company, Limited<br>London, England |
| [32] | Priority | Apr. 11, 1968 |
| [33] | | Great Britain |
| [31] | | 17,436/68 |

[54] DUTY CYCLE CONTROL APPARATUS
5 Claims, 3 Drawing Figs.

[52] U.S. Cl. .................................................... 318/341,
                                                            317/335 C
[51] Int. Cl. ..................................................... H02p 5/16
[50] Field of Search ........................................ 318/331,
        334, 341, 434; 317/13, 27, 33, 13 R, 335 C

[56] References Cited
UNITED STATES PATENTS

| 3,372,304 | 3/1968 | Kuipers | 317/335 C |
|---|---|---|---|
| 3,275,926 | 9/1966 | Sheheen | 318/341 |
| 3,293,523 | 12/1966 | Hutson | 318/331 |
| 3,324,372 | 6/1967 | Myers | 318/331 |
| 3,381,199 | 4/1968 | Persson | 318/334 |
| 3,427,506 | 2/1969 | Thiele | 317/33 |
| 3,486,834 | 11/1969 | Billings | 317/33 |
| 3,480,852 | 11/1969 | Hung | 317/33 |

*Primary Examiner*—Bernard A. Gilheany
*Assistant Examiner*—Thomas Langer
*Attorney*—Larson, Taylor & Hinds ABSTRACT: A duty cycle control apparatus for a traction motor or the like is provided which controls the mean voltage applied to an inductive load from a direct current source in response to an applied control signal. The apparatus includes a semiconductor controllable rectifier connected between the source and load, a control circuit for rendering the semiconductor controllable rectifier alternately conducting and nonconducting in accordance with a variable mark-to-space ratio, a unidirectionally conductive freewheeling current path around the load for enabling load current to flow during the time between "on" periods of the rectifier, and a current sensing device for producing a current-limiting signal indicative of mean current flowing from the source through the rectifier. The control circuit acts, responsive to the current-limiting signal, to impose a restriction upon the available maximum mark-to-space ratio so as to tend to maintain the mean current in the controllable rectifier within predetermined limits without correspondingly limiting the current in the load.

DUTY CYCLE CONTROL APPARATUS

This invention relates to duty cycle control apparatus and relates especially but not exclusively to such apparatus which employs a semiconductor controllable rectifier device mounted on a heat sink in a chopper circuit which varies the mark-to-space ratio of current pulses supplied from a source to a load.

According to the present invention there is provided duty cycle control apparatus for controlling in response to an applied control signal, the mean voltage applied to an inductive load from a direct current source, comprising input terminals for connection to the source, output terminals for connection to the load, a semiconductor controllable rectifier connected in a current path between the input and output terminals, a control circuit for rendering the semiconductor controllable rectifier alternately conducting and nonconducting in accordance with a variable mark-to-space ratio of "on" periods of current flow from the source to the load to "off" periods of no current flow from the source to the load, a unidirectionally conductive free-wheeling current path around the load for enabling load current to flow between said "on" periods, and current-sensing means for producing a current-limiting signal indicative of mean current flowing from the source through the semiconductor rectifier, said control circuit acting, responsive to said current-limiting signal, to impose a restriction upon the available maximum mark-to-space ratio so as to tend to maintain the mean current in the semiconductor rectifier within predetermined limits without correspondingly limiting the current in the load.

Where the load in inductive, such as in the case of a DC traction motor, it is possible by restricting the duty ratio in accordance with the invention, to take a lower mean current through the control apparatus while still retaining the full motor current, bearing in mind that a free-wheeling current path is normally provided. By selecting a duty ratio of pulses to the load from the source it can be arranged that the apparatus can give rise to a load current at a continuous current rating which is higher than would otherwise be so. It is of course true however that the power to the motor being dependent upon mean voltage is reduced on reduction of the mark-to-space ratio.

The present invention makes the assumption that the thermal time constant of the junction-to-base temperature gradient of a semiconductor device employed as the duty cycle control means in the apparatus, is long compared to the pulse time. If a 100-percent duty ratio for a given current is restricted to a 50-percent ratio for the same current then the current flows in the device for only half the time and the mean apparatus overall losses are halved without any necessary reduction of load current in an inductive load having a free-wheeling path.

To a first approximation, halving the losses halves the temperature gradient between the semiconductor device junction and the cooling heat sink thereof and according to a further aspect of the present invention, a signal can be derived indicative of temperature gradient between semiconductor junction and heat sink and when the signal attains a given value, the duty ratio of the apparatus becomes dependent thereon.

In order that the invention may be more clearly understood and readily carried into effect, the same will be further described by way of example with reference to the accompanying drawing of which:

In discussing the invention, it will be assumed that the apparatus to be described is employed for varying the mark-to-space ratio of current applied at a DC traction motor from a battery, the means for varying the mark-to-space ratio comprising a suitable regulator which controls the relative "on" to "off" periods of a semiconductor controllable rectifier switching device.

Provided that the pulsing times are short compared with the junction time constant of the semiconductor device, it is the average heat loss due to the passage of load current flowing in the device which sets the rating for the equipment. In a perfect system where the load has an infinite inductance, the pulse current may be taken as being a series of square-topped pulses having a peak value equal to the mean motor current. The average loss of the devices is a function of current and duty ratio. For the same motor current, having the duty ratio will, as mentioned in the foregoing, halve the mean loss of the device.

Since a reduced duty ratio leads to a lower loss in the form of heat from the semiconductor device for a given motor current, a time rating, that is the time for which the apparatus can operate for the given load current condition, rises as the duty ratio falls. If the reduction of duty ratio is sufficient, the result is an eventual continuous rating at a given current for the combination of the semiconductor rectifier device and the cooling means provided for it.

Figure 1:
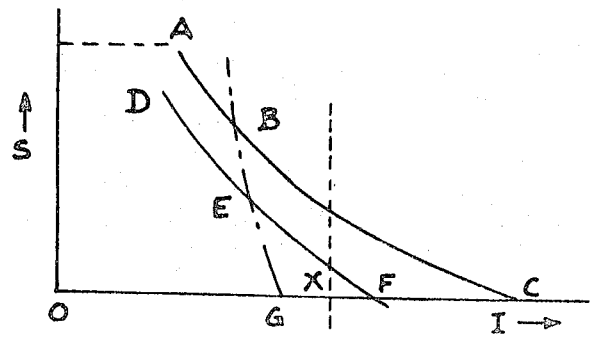
FIG. 1 illustrates graphically considerations underlying the invention.

Referring to FIG. 1, in this graphical illustration, the curves ABC and DEF are typical of a family of motor typical characteristics plotted with speed against current. The curve ABC represents a characteristic for 100-percent duty ratio and the curve DEF represents a typical corresponding characteristic for a somewhat reduced duty ratio. The maximum allowable current for continuous operation at 100-percent duty ratio is represented typically by a point such as B and correspondingly the allowable current for reduced duty ratio with continuous operation is represented by a point such as E. A curve such as the broken curve BEG therefore represents the maximum current-against speed characteristic which can be obtained from the motor at a continuous rating of the control apparatus. The area bounded by OABEG is therefore available for continuous control by means of the apparatus and any point within this area the apparatus has a continuous rating within the capability of the semiconductor device and cooling means.

Assuming that the apparatus is provided with current-limiting means which prevents currents in excess of those indicated by the current value X, control in the area BEGX is available only on the basis of a short time rating or possibly by means of a contactor which bypasses the apparatus. It may be seen however that under these conditions where a motor is operating under heavy current, precise continuous control is less likely to be required. In the case of a battery driven vehicle, the vehicle may be proceeding up an incline.

It will be seen from the foregoing that it is desirable to restrict the average current in the main current-carrying semiconductor device of the apparatus in such a way that the maximum permitted mean current is not exceeded. An approximate method can take advantage of the fact that the losses in a semiconductor device are dependent largely upon mean value of current and only partially upon R.M.S. value of current. For approximation purposes therefore the R.M.S. value of current may be ignored and this is what is assumed in the circuit arrangement of FIG. 2.

Figure 2:
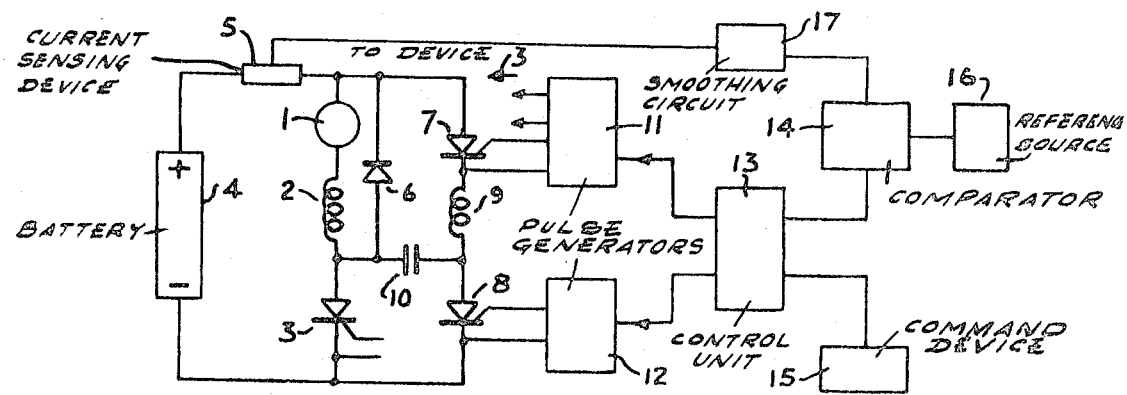
FIG. 2 illustrates in block form one embodiment of a simple mode of utilization of the invention.

Referring to FIG. 2, DC motor has an armature 1 and a series field winding 2 and is supplied with current via a main controllable semiconductor rectifier device 3 from a battery 4. Also in series with the motor there is provided a current-sensing device 5. Across the motor there is provided a free-wheeling diode 6 and associated with the semiconductor controllable rectifier device 3 are two further controllable rectifier devices 7 and 8, with an inductance 9 and commutation capacitor 10. The devices 7 and 8 are provided with associated pulse generators 11 and 12 the generator 11 also providing triggering pulses to the device 3. The timing of pulses to the devices 3, 7 and 8 is determined by a control unit 13 which receives one input signal from a comparator 14 and another from a command device 15. The comparator 14 receives a current reference signal from the reference source 16 and a smoothed current signal via the smoothing circuit 17 from the current sensing device 5.

In operation of the circuit arrangement of FIG. 2, the basic power circuit consists of the semiconductor controllable rectifier devices 3, 7 and 8 and associated components. In order to initiate conducting periods for the current to the motor from the battery 4, the generator 11 produces triggering pulses to the devices 3 and 7. On initiation of the conduction of the device 3 current commences to flow via the device 3 and the motor. At the same time, the capacitor 10 becomes charged via the device 7 and the device 3 via the inductance 9 and on subsequent rendering conducting of the device 8 by a gate pulse from the generator 12, the capacitor 10 is connected across 3 with such polarity as to reverse bias 3 into the nonconducting condition. The action is repetitive and the control unit 13 varies the mark-to-space ratio of current pulses applied to the motor via 3 from the source 4. It will be appreciated however that the current in the motor is substantially continuous by virtue of the free-wheeling diode 6.

The battery current and therefore the mean current in the device 3 is measured by the sensing device 5, smoothed by the smoothing circuit 17 and the resulting signal is fed to the comparator 14 in which it is compared with the reference from the source 16. The resultant signal is fed together with the command signal from 15 into the control unit 13. In the event of the smoothed current signal derived from 17 tending to exceed the reference from 16, the command signal from 15 is over-ridden such that the mark-to-space ratio determined by the control unit 13 is then controlled by the mean current and while this condition persists, the mean battery current is maintained substantially constant. This constant mean battery current continues until there is a reduction in the current drawn, due for example to an increase of motor speed or until the value of the signal from 15 changes to a value which reduces the mark-to-space ratio. The value of the reference derived from the source 16 is so chosen as to maintain the operating characteristic of the apparatus within the allowable bounds of the region OABEG referred to above with reference to FIG. 1.

The command signal from the device 15 may if desired, itself, be made temperature dependent. That is, it may be arranged to have a maximum value which is reduceable with increase of temperature of the controllable rectifier device 3. In this case, the maximum mark-to-space ratio obtainable is restricted either by the mean current in the device 3 tending to be too great or by the temperature of the controllable rectifier device increasing.

Again, as will be seen, the value of signal voltage indicative of mean current in the semiconductor device may be utilized, after being suitably amplified, to provide a current-limiting control for directly overriding the voltage of signal derived from the foot pedal to restrict the duty ratio for high peak currents in the semiconductor device without restricting current in the inductive load.

Figure 3:
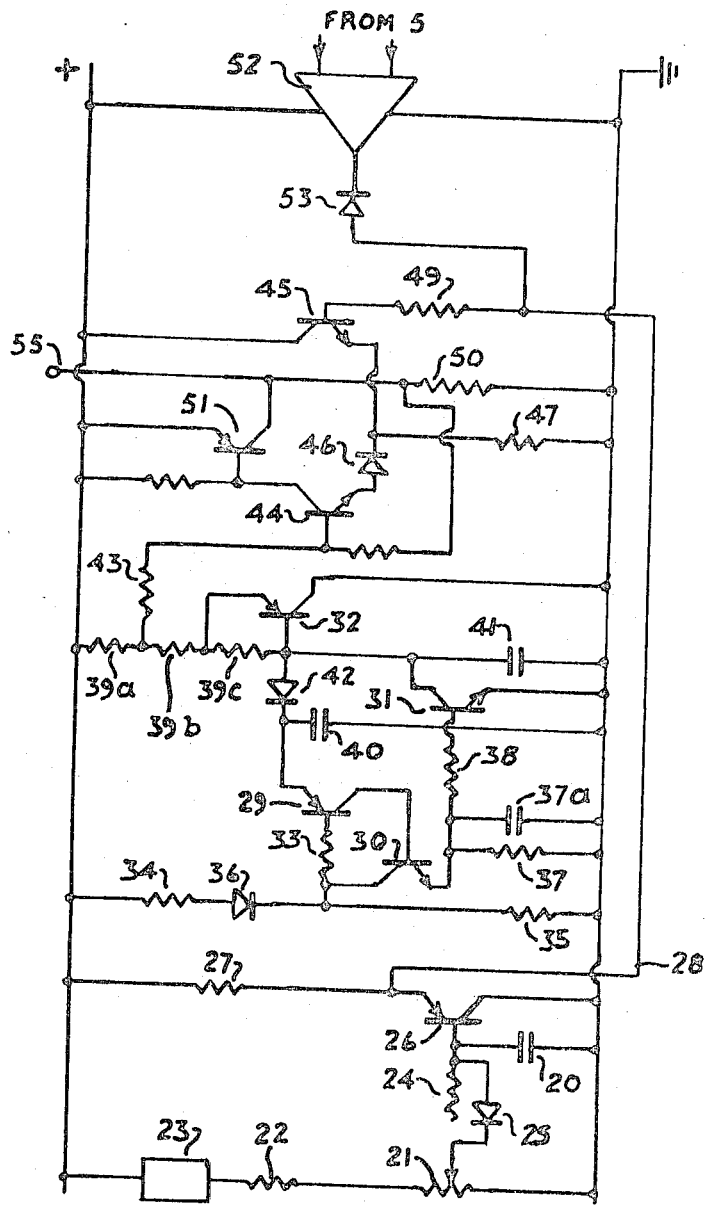
FIG. 3 illustrates a circuit of part of a duty cycle apparatus according to the invention.

One form of part of a circuit arrangement for utilizing the invention illustrated in FIG. 3, in which it is assumed that the apparatus is to be mounted for controlling the traction motor of an electric vehicle. Accordingly, the vehicle is provided with a foot pedal not shown, arranged to be mechanically coupled to a variable potentiometer 21 in series with which there is a resistor 22 and a thermistor 23 having a positive temperature coefficient. The components 21, 22 and 23 are connected in series across the supply lines for the circuit as indicated and the movable tapping on the potentiometer 21 is connected via a resistor 24 shunted by a diode 25, to the base electrode of a transistor 26, the emitter electrode of which is connected to the positive supply line via a resistor 27 and the collector electrode of which is connected to the zero-volts line. The emitter electrode of 26 is also connected via a lead 28 to one side of a comparator circuit to be referred to hereafter. The other side of the comparator circuit receives a varying sawtooth ramp signal from a ramp generator circuit.

The ramp waveform generator circuit is based on transistors 29, 30, 31 and 32 as shown. The transistor 29 has its base electrode connected via a base current-limiting resistor 33 to a tapping on a potential divider formed by resistors 34 and 35 with a series diode 36. The collector electrode of 29 is connected to the base electrode of a transistor 30 the collector electrode of which is coupled back to the supply side of the resistor 29. Further, the emitter electrode of 30 is connected via a resistor 38 to the base electrode of the transistor 31, biassing components for which comprise the capacitor 37a and the resistor 37. The collector electrode 31 is connected to the junction of a series of resistors 39a, 39b, 39c, and a capacitor 41. The emitter of 31 further is connected to the zero-volts line as shown and, the emitter electrode of the transistor 29 referred to above is connected via a diode 42 to the junction of 39c and 41 of which the base electrode of transistor 32 is also connected. The emitter of 32 is connected to the junction of resistors 39 and 40 and this chain of components is connected across the supply lines as shown.

The output of the ramp generator is derived from the junction of resistors 39a and 39b via a resistor 43 to the base electrode of one transistor 44 of the above mentioned comparator circuit. The above mentioned lead 28 is connected to the base electrode of a second transistor 45 of the comparator circuit and 44 and 45 have their emitter electrodes connected in common, (44 being via a diode 46) to a common emitter resistor 47. The comparator circuit includes a further transistor 51 the base electrode of which is connected to the connector electrode of 44 and the collector electrode of which is connected via a resistor 50 to the zero-volts line and this collector provides the output signal which can be regarded as a variable mark-space-ratio wave form for controlling controllable rectifier devices of the power supply circuit such as shown in FIG. 2, for the motor of the vehicle.

In addition to the aforementioned connection via the lead 28 from the foot pedal control transistor 26 to the base electrode of the comparator transistor 45, there is also connected an output from a current limit amplifier 52 via a diode 53. This connection is an common with the lead 28 via the resistor 49 to the base electrode of the transmitter 45. As input to the current limit amplifier 52 is derived from a current-sensing shunt device such as the device 5 illustrated in FIG. 2 and referred to above. This input signal is a DC signal and the amplifier 52 is a differential DC amplifier of any suitable form, known to persons skilled in the art, for producing a smooth output voltage of appropriate polarity via the diode 53 to the comparator circuit.

In operation of the circuit arrangement of FIG. 3, many of the components are of conventional form and need not be described in great detail. It will be convenient to describe the circuit in parts. Firstly the pedal control circuit consists of the transistor 26 and the associated driving components therefor. The position of the movable contact on the potentiometer 21, which corresponds to zero mark-to-space ratio for the circuit, is the lower most position and assuming that the operator of the vehicle depresses the pedal, the movable contact of 21 is moved in the upward direction towards the positive supply line. Accordingly, the capacitor 20 across the base drive circuit for the transistor 26 charges at a rate dependent upon the value of the resistor 24 and the capacitor. Accordingly, it is normally impossible by rapid depression of the foot pedal to cause excessive initial inrush current into the motor as a result of a sudden application of a high mark-space-ratio from the controller.

Referring again now to the ramp generator, this consists of the transistors 29, 30, 31 and 32 and operates at a constant frequency to produce an approximately sawtooth ramp waveform via the large resistor 43 to the base electrode of the transistor 44 of the comparator circuit. Considering an instant in time at which the transistors 29, 30 and 31 are nonconducting and ignoring for the present the effect of transistor 32, the capacitor 41 of the ramp generating circuit charges via the series resistors 39a, 39b and 39c. Thus a progressively increasing positive potential is generated at the junction of resistors 39a and 39b. At a time dependent upon the time constant of the charging circuit for the capacitor 41, the potential at the junction of 41 and 42, attains a value at which the transistor 29, which has a fixed base reference derived from 34 and 35, begins to conduct via the base emitter circuit of transistor 30. Transistor 30 therefore begins to conduct to supplement the base current to transistor 29 and transistors 29 and 30 rapidly turn on regeneratively to provide fast turn-on of transistor 31, which up to this point in the cycle has been biassed into the nonconducting condition. Rapid discharge of capacitor 41 therefore than ensues via the collector circuit of transistor 31 and the circuit returns to its starting point. The additional capacitor 40 is a very small capacitor as compared to the main capacitor 41 of the ramp generator charging circuit but it is sufficient to maintain the conduction of transistors 29, 30 and 31 beyond the point at which 41 is discharged sufficiently for the diode 42 to cease forward conduction. Diode 42 provides a more critical threshold level for the ramp than may otherwise be provided and the diode 36 in the base reference circuit for transistor 29 renders the circuit immune to reverse voltage spikes.

In many applications it is desirable to build a predetermined degree of nonlinearity into the ramp generator circuit and with this in view, the transistor 32 affords such nonlinearity by providing a progressively increasing resistance across the capacitor 40 during the charging period thereof.

The comparator circuit to which the positive going ramp voltage is applied via 41 operates as a two state circuit, the voltage at 55 thereby depending upon the conducting or nonconducting state of transistor 51. Assuming an initial condition at the lowermost point of the applied ramp waveform, transistor 45 may be regarded as conducting and transistors 44 and 51 nonconducting. When the ramp voltage at the base electrode of 44 attains a positive value in the region of the positive control potential derived from the foot pedal control or the overriding current limit circuit, transistor 44 begins to conduct to provide base current to transistor 51 which therefore also begins to conduct. Conduction of 51 effects regenerative drive to the base electrode of 44 by raising the potential across the resistor 50. Rapid switching of the circuit therefore occurs into a condition in which transistors 44 and 51 are conducting fully and transistor 45 of the common emitter connected pair 44 and 45 is turned off. There is therefore a corresponding transition of the output voltage at 55 from one positive value to a higher positive value. This transition is utilized for example by means of a differentiating circuit, to initiate a pulse in the thyristor-gate-pulsing circuit such as circuit 12 of FIG. 2. This pulse initiates an "on" period of the basic power-circuit-controlling mean voltage to the load. Correspondingly, the subsequent transition in the opposite direction which occurs when the ramp resets as explained above, and causes the comparator to switch to the opposite condition is effective to cause the thyristor gate pulse generator such as generator 11 of FIG. 2, to produce a gate pulse. This latter gate pulse initiates the "on" period of the basic power circuit controlling the mean voltage to the load.

Referring now to the mean current sensing and limiting aspect of the apparatus, the amplifier 52 of FIG. 3 is arranged to suitably provide an output potential depending upon the smoothed current level in the current-sensing element such as 5 of FIG. 2. This potential is utilized in the simple embodiment of FIG. 3 to override the control signal derived via lead 28 from the foot pedal control. When the current signal potential is less positive than the signal on line 28, the diode 53 conducts and the foot pedal control output voltage is clamped to the voltage level produced by 52. Accordingly, the maximum value of mark-space-ratio obtainable is restricted to a value corresponding to a point of the ramp waveform, not determined by the foot pedal control, but by an indication of mean current in the controllable rectifier device of the basic power circuit.

The arrangement illustrated schematically in FIG. 2, where the current signal potential from 17 is compared with a reference level to determine a clamping level of the mark-to-space ratio is an obvious alternative to the above. Thus in the circuit of FIG. 3, the amplifier may, if desired, be arranged such as to amplify the difference between the current signal from 5 and a reference and produce an increasing less positive output indicative of a tendancy for the current signal to exceed the reference. This again overrides the signal on 28 to tend to hold the mean current in the controlling semiconductor device within allowable limits without corresponding restriction of load current.

Referring to the thermistor which is connected to series with the potentiometer 21 of the foot pedal control circuit, this thermistor is connected in close thermal relationship with the main semiconductor device which controls the main current to the motor 1. Accordingly, if the junction temperature of this device tends to rise towards a dangerous level as a result of too greater current being drawn for too long a period, the resistance of the thermistor increases and hence tends to adjust the gain of the pedal device and control circuit to lower the potential which is derived from the potentiometer 21 for application to the base electrode of the transistor 26. Accordingly, such a rise of temperature gives rise to an automatic reduction of the available mark-space-ratio at which the apparatus can operate quite regardless of the current limit control provided by virtue of the differential amplifier 52.

In a further alternative embodiment of the invention which can be arranged to operate not on any assumption of the losses in the semiconductor device being a function of mean current, may employ means which provides for a variable current limit. The control unit 13 can be arranged to provide a variable mark-to-space ratio control in response to a control device and "switch off" of the system can be again made responsive to a current limit. However, the current limit is now made to follow a law which produces with duration of the conducting period of the main controllable rectifier device. The peak current permitted therefore varies with the duration of current flow and the low governing variation of the current limit can be adjusted to give the desired current and duty ratio in accordance with the ratings of the apparatus.

In a further embodiment of the invention, allowance can be made for the thermal mass of the cooling system associated with the controllable rectifier device. This may be achieved, for example, by modifying the limit current in an arrangement such as described in the foregoing, in accordance with the temperature of the cooling fins or cooling medium. By so doing, the lower the temperature of the cooling medium, the higher can be the permitted losses and rating of the equipment. The reference source 16, for example, in the circuit arrangement of FIG. 2, may include a components variable in proportion to the cooling medium's temperature and a fixed component representing the junction-to cooling medium temperature gradient.

Again, a signal may be derived either from the motor or from the controllable rectifier component or by other means a signal which represents the steady state temperature gradient between the junction and cooling means of the semiconductor device at the load condition and the duty ratio obtaining at the instant in question. The use of this signal or a signal proportional to the temperature of the main semiconductor device junction on reaching a level representing the maximum safe temperature or temperature rise of the main device junction the output of the apparatus is restricted. This is achieved by either operating on the maximum current which is permitted, the maximum duty ratio, or a combination of both of these.

I claim:

1. A duty cycle control apparatus for controlling, in response to an applied control signal, the mean voltage applied to an inductive load from a direct current source, comprising input terminals for connection to the source, output terminals for connection to the load, a semiconductor controllable rectifier connected in a current path between the input and output terminals, a control circuit for rendering the semiconductor controllable rectifier alternately conducting and nonconducting in accordance with a variable mark-to-space ratio of "on" periods of current flow from the source to the load to "off" periods of no current flow from the source to the load, a unidirectionally conductive freewheeling current path around the load for enabling load current to flow between said "on" periods, and current-sensing means for producing a current-limiting signal indicative of mean current flowing from the source through the semiconductor rectifier, said control circuit including means responsive to said current limiting signal for varying said mark-to-space ratio during the continuous operation of said apparatus in accordance with said signal when said signal exceeds a predetermined value and for maintaining the operation of the apparatus at a corresponding mark-to-space ratio until said signal no longer exceeds said predetermined value such as to impose a restriction upon the available maximum mark-to-space ratio so as to tend to maintain the mean current of the controllable rectifier within predetermined limits without to the same extent limiting the current in the load.

2. Duty cycle control apparatus as claimed in claim 1 further means for producing a reference signal, and comparator means connected to the output of said current-sensing means and to the output of said reference signal-producing means for comparing the output of said current-sensing means with said reference signal and for producing a control signal when the current limit set by said reference signal is tending to be exceeded for initiating an "off" period of the duty cycle control apparatus.

3. Duty cycle control apparatus as claimed in claim 2 further comprising a manually operated control means for producing a command signal indicative of a desired mark-to-space ratio and including a temperature dependent device for adjusting the gain of said control circuit in accordance with temperature.

4. Duty cycle control apparatus as claimed in claim 2 further comprising an integrator for integrating the current flow during "on" periods of the duty control apparatus.

5. Duty cycle apparatus as claimed in claim 1 further comprising a signal comparator circuit including first and second inputs, means for applying a ramp waveform to said first input of said signal comparator, and means for applying a command signal of a desired mark-to-space ratio to said second input of said signal comparator, said comparator switching from a condition which initiates an "on" period to a condition which initiates an "off" period responsive to the input signals at said first and second inputs being equal.

* * * * *